US008374581B2

(12) United States Patent
Chapman, Jr. et al.

(10) Patent No.: US 8,374,581 B2
(45) Date of Patent: Feb. 12, 2013

(54) WIRELESS COMMUNICATIONS DEVICE AND METHOD FOR USE WITH TELEPHONE NETWORK EDGE NODE PROVIDING PRIVACY

(75) Inventors: Robert Ellis Chapman, Jr., Raleigh, NC (US); Edith Helen Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 11/738,025

(22) Filed: Apr. 20, 2007

(65) Prior Publication Data

US 2007/0207787 A1 Sep. 6, 2007

Related U.S. Application Data

(60) Continuation of application No. 11/326,535, filed on Jan. 5, 2006, now Pat. No. 7,289,789, which is a division of application No. 09/664,180, filed on Sep. 18, 2000, now Pat. No. 7,016,667.

(51) Int. Cl.
*H04M 1/68* (2006.01)
(52) U.S. Cl. ............ 455/411; 455/410; 455/435.1; 455/450; 455/560; 370/328; 370/338
(58) Field of Classification Search .......... 455/411, 455/410, 560, 450, 435.1, 436; 370/328, 370/338
See application file for complete search history.

(56) References Cited

U.S. PATENT DOCUMENTS

| | | | |
|---|---|---|---|
| 5,513,245 A | 4/1996 | Mizikovsky et al. | 455/411 |
| 5,734,706 A | 3/1998 | Windsor et al. | 379/142 |
| 5,758,284 A | 5/1998 | Chavez, Jr. et al. | |
| 5,862,475 A | 1/1999 | Zicker et al. | 455/419 |
| 5,901,352 A | 5/1999 | St-Pierre et al. | 465/426.1 |
| 5,926,755 A | 7/1999 | Ghisler | |
| 5,940,515 A * | 8/1999 | Kasavaraju | 380/270 |
| 5,987,318 A | 11/1999 | Alperovich et al. | 455/416 |
| 6,081,705 A * | 6/2000 | Houde et al. | 455/411 |
| 6,141,556 A | 10/2000 | Dougherty et al. | |
| 6,212,377 B1 | 4/2001 | Dufour et al. | |
| 6,226,516 B1 | 5/2001 | Gupta et al. | 455/433 |
| 6,236,854 B1 | 5/2001 | Bradshaw | 455/416 |
| 6,243,451 B1 | 6/2001 | Shah et al. | 379/201 |
| 6,272,117 B1 | 8/2001 | Choi et al. | 370/330 |
| 6,282,421 B1 | 8/2001 | Chatterjee | 455/435 |
| 6,434,394 B1 | 8/2002 | Grundvig et al. | |
| 6,606,491 B1 | 8/2003 | Peck | 455/411 |

(Continued)

OTHER PUBLICATIONS

"Sharing of Wirelines Using a Network Node Device," U.S. Appl. No. 09/664,229 (Sep. 18, 2000).

(Continued)

*Primary Examiner* — Amancio Gonzalez
(74) *Attorney, Agent, or Firm* — Ryan, Mason & Lewis, LLP

(57) ABSTRACT

A wireless device connects to one or more network node devices that are in turn connected to one or more wirelines. The wireless device has one or more wireless signal generators supporting one or more of the wireless connections and one or more memories to store an identifier. One or more negotiators negotiate with the network node device in order to establish a connection to one or more wirelines connected to the network node and a requesting process requests bridging to a call in progress.

9 Claims, 17 Drawing Sheets

CLASS OF SERVICE TABLE SHOWING ASSOCIATION OF SERVICES TO PIN#

| PIN # | FIRST/ONLY DEDICATED LINE # INCOMING/OUTGOING/BOTH |
|---|---|
| | (ADDITIONAL DEDICATED LINE #, etc.) |
| | LAST DEDICATED LINE # INCOMING/OUTGOING/BOTH |
| | PRIVACY FEATURE ALLOWED |
| | PRIVACY FEATURE DURING CALL |
| | PRIVACY DISCONNECT ALLOWED |
| | PRIVACY DISCONNECT PRIORITY |
| | BRIDGING ALLOWED |
| | SHARED OUTGOING SERVICE ALLOWED |
| | SHARED OUTGOING SERVICE MAX LINES |
| | SHARED OUTGOING SERVICE ACCESS PRIORITY |
| | SHARED OUTGOING SERVICE PRE-EMPT PRIORITY |
| | SHARED INCOMING LINE ACCESS NUMBER |
| | SHARED INCOMING SERVICE MAX LINES |
| | CALL WAITING NOTIFY NEVER/ALWAYS/NEWEST/OLDEST |
| | CAMP-ON ALLOWED |
| | JOIN ALLOWED |

U.S. PATENT DOCUMENTS

| | | | |
|---|---|---|---|
| 6,608,820 B1 | 8/2003 | Bradshaw, Jr. | |
| 6,625,145 B1* | 9/2003 | Winell | 370/389 |
| 6,625,461 B1* | 9/2003 | Bertacchi | 455/466 |
| 6,681,118 B2* | 1/2004 | Raffel et al. | 455/552.1 |
| 6,704,796 B1 | 3/2004 | Cosgriff et al. | 455/428 |
| 6,735,432 B1* | 5/2004 | Jarett et al. | 455/417 |
| 6,879,825 B1 | 4/2005 | Daly | 455/419 |
| 7,035,646 B2* | 4/2006 | Raffel et al. | 455/456.1 |
| 7,212,802 B2* | 5/2007 | Rodriguez | 455/405 |
| 2003/0050090 A1* | 3/2003 | Raffel et al. | 455/552 |
| 2003/0069014 A1* | 4/2003 | Raffel et al. | 455/426 |
| 2003/0133558 A1 | 7/2003 | Kung et al. | 379/215.01 |
| 2003/0195000 A1* | 10/2003 | Rodriguez | 455/435.1 |
| 2004/0152482 A1* | 8/2004 | Raffel et al. | 455/522 |
| 2004/0190471 A1* | 9/2004 | Bender et al. | 370/329 |

OTHER PUBLICATIONS

"Hybrid Wireline Wireless Network Service," U.S. Appl. No. 09/664,328 (Sep. 18, 2000).

"Business Method for Hybrid Wireline Wireless Network Service," US. Appl. No. 09/664,329 (Sep. 18, 2000).

"Hybrid Wireline Wireless Phone Service," U.S. Appl. No. 09/664,460 (Sep. 18, 2000).

"Wireless Communications Device," U.S. Appl. No. 09/664,478 (Sep. 18, 2000).

"Telephone Network Edge Node Device for Bridging and Privacy," U.S. Appl. No. 09/664,479 (Sep. 18, 2000).

"Configuring and Maintaining Network Node Device," U.S. Appl. No. 09/664,549 (Sep. 18, 2000).

* cited by examiner

CLASS OF SERVICE TABLE SHOWING ASSOCIATION OF SERVICES TO PIN #

| PIN # | FIRST/ONLY DEDICATED LINE # INCOMING/OUTGOING/BOTH |
|---|---|
| | (ADDITIONAL DEDICATED LINE #, etc.) |
| | LAST DEDICATED LINE # INCOMING/OUTGOING/BOTH |
| | PRIVACY FEATURE ALLOWED |
| | PRIVACY FEATURE DURING CALL |
| | PRIVACY DISCONNECT ALLOWED |
| | PRIVACY DISCONNECT PRIORITY |
| | BRIDGING ALLOWED |
| | SHARED OUTGOING SERVICE ALLOWED |
| | SHARED OUTGOING SERVICE MAX LINES |
| | SHARED OUTGOING SERVICE ACCESS PRIORITY |
| | SHARED OUTGOING SERVICE PRE-EMPT PRIORITY |
| | SHARED INCOMING LINE ACCESS NUMBER |
| | SHARED INCOMING SERVICE MAX LINES |
| | CALL WAITING NOTIFY NEVER/ALWAYS/NEWEST/OLDEST |
| | CAMP-ON ALLOWED |
| | JOIN ALLOWED |

FIG. 11

ASSOCIATION OF DEDICATED AND SHARED LINE(S) TO PIN #S

| INCOMING ENTITY | | PRIORITY | PIN ASSIGNMENT |
|---|---|---|---|
| DEDICATED LINE 1 | | | PIN xxxx |
| DEDICATED LINE 2 | | | PIN aaaa; PIN yyyy; PIN zzzz; etc. |
| ... | | | ... |
| DEDICATED LINE N | | | PIN xxxx; (PIN yyyy; PIN zzzz; etc.) |
| SHARED 1 | INCOMING CODE xxxx | p | PIN bbbb |
| | INCOMING CODE yyyy | p | PIN cccc |
| | INCOMING CODE zzzz | p | PIN dddd |
| | ... | | ... |
| SHARED 2 | INCOMING CODE xxxx | p | PIN bbbb |
| | INCOMING CODE bbbb | p | PIN eeee |
| | ... | | ... |
| SHARED N | INCOMING CODE 1111 | p | PIN mmmm; (PIN yyyy; PIN zzzz; etc.) |
| | INCOMING CODE 2222 | p | PIN nnnn; (PIN yyyy; PIN zzzz; etc.) |
| | ... | | ... |

1201 — DEDICATED LINE 1
1202 — DEDICATED LINE 2
1203 — SHARED 1
1204 — SHARED 2

FIG.12

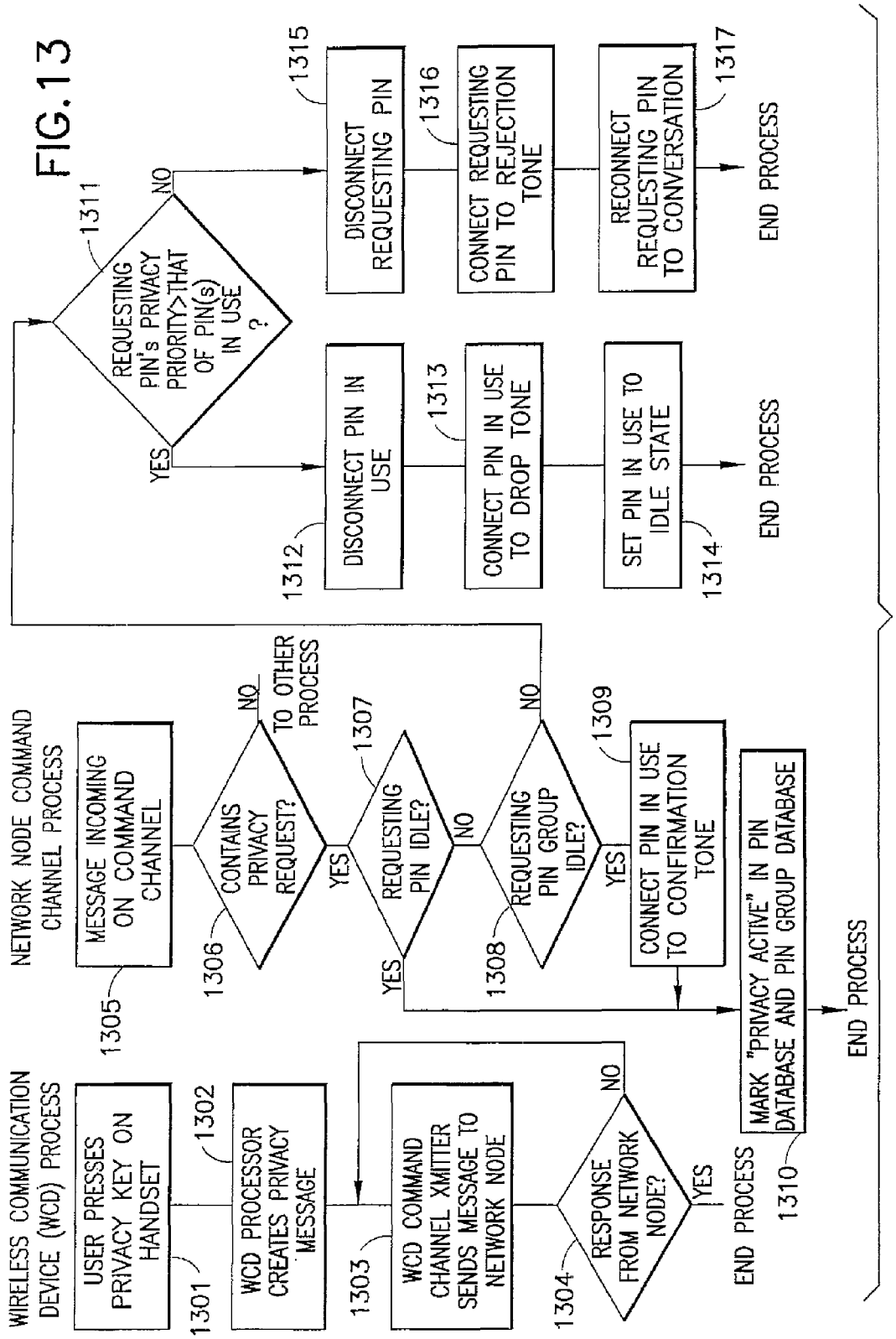

WIRELESS COMMUNICATIONS DEVICE AND METHOD FOR USE WITH TELEPHONE NETWORK EDGE NODE PROVIDING PRIVACY

CROSS-REFERENCE TO RELATED APPLICATIONS

This is a continuation of U.S. patent application Ser. No. 11/326,535, filed Jan. 5, 2006 now U.S. Pat. No. 7,289,789, which is a divisional of U.S. patent application Ser. No. 09/664,180 filed Sep. 18, 2000 now U.S. Pat. No. 7,016,667, each incorporated by reference herein.

FIELD OF THE INVENTION

This invention relates to connecting a network to one or more radio frequency channels. More specifically, the invention relates to connecting a telephone network to one or more radio frequency channels.

BACKGROUND OF THE INVENTION

Refer to FIG. 1. The use of telephone service has dramatically increased as a result of the popularity of the Internet. In addition to a single telephone line for voice conversation, it is increasingly common to find homes with multiple phone lines 135, so that the second line can be used for business or for Internet access.

Wire line residential phone service essentially means connecting a twisted pair of wires 110 originating in the central office of the telephone company to a physical wired circuit, connected to a number of wired phones in the residence 115. These twisted pairs are packaged in bundles of up to several thousand wires, attached to a switch through a wiring frame in the central office and these large bundles are then attached from telephone pole 120 to telephone pole through the neighborhoods. Outside a given residence the particular pair of wires that provide service to that residence is exited from the bundle and brought to the house, where it is attached to the in-house wiring. Once the twisted pair is attached to the in-house wiring, it may be connected to a traditional, wired telephone 125, as is manufactured by Southwestern Bell, GE or Sony.

Cordless phones are terminal devices attached to the existing land line (wired) networks of today. Two devices comprise a cordless phone 130: a base unit and a handset. The base unit connects directly to one or two wired lines of the existing network and extends them by radio to the handset. The cordless phone provides total transparency, viz: the land line network does not know that it is terminated in a cordless phone rather than a traditional wired telephone set. The base unit's main functions are to provide a full-duplex audio channel between the land line and the handset, and an interface between the wired network signaling and appropriate devices in the handset such as the switch hook, the bell (alerting device), and the dial pad. Various methods are used in cordless phones to provide security, meaning protection against unauthorized use of the land line channels, and privacy, meaning protection from eavesdropping. Cordless phones are typically sold in base-handset pairs which can be set to one of several code-patterns by the consumer, usually by means of a multi-contact switch bank. The radio-frequency sections of cordless phones are low-power and with the exception of high-end units which use spread-spectrum frequency-hopping techniques as a security means, they are not frequency-agile, meaning they do not change frequency during a call. In particular, cordless phones do not use frequency agility as a means of improving the switching functions or services of the networks to which they are connected.

Cellular telephone systems, while cordless, are substantially different from cordless telephone sets. Cellular telephone handsets are both frequency-mobile and power-mobile, and are constantly supervised by the cell controller. They use many more frequencies than cordless telephones. The fundamental feature of cellular systems is to provide mobility of the handsets over wide areas, even hundreds of miles. It is not possible to provide sufficient RF power to cover wide areas, and there are insufficient assigned frequencies to serve the number of users on a frequency-per-user basis. As a result, cellular telephony divides all geography into relatively small "cells", each with a central antenna 140, using a subset of all frequencies, allowing low-power communications with handsets 145, inside the cell boundary. Each cell adjacent to a given cell will use a different subset of frequencies (146, 147), and cells a short distance away can reuse the same frequencies because of the low RF power used in the cells. The control system for cellular telephone systems is extremely complex. Each cell controller continually monitors the signal strength of all handsets in its own cell and in adjacent cells, so when a handset moves into the boundary between two cells, both cell controllers know where the handset is and in what direction it is moving. At the appropriate moment a 'hand-off' occurs during which the cell controllers instruct the handset to change to a frequency that is used in the cell it is entering. At the same time the land line connection is changed from the old cell to the new cell, providing continuity for the voice connection.

To provide wireless data access in well trafficked areas such as hotels and airports, firms such as MobileStar (http://www.mobilestar.com) provide publicly accessible wireless LANs. These allow subscribers, equipped with the appropriate passwords, hardware and software for their laptops, to communicate through wireless LAN techniques, and through a gateway and router to their corporate LANs and the Internet. The wireless access point in the airport or hotel is generally provisioned with a broadband (T1 or above) wired channel to the network. These facilities are shared rather than dedicated, with the routers functioning to transfer packets to their appropriate destinations.

PROBLEMS WITH THE PRIOR ART

Installation and maintenance of traditional wired telephony service from the pole or post to the structure and then within the structure to the telephone instrument(s) is a labor intensive operation. To install service it is necessary to dispatch personnel to the site. When service failures occur it is also often necessary to dispatch maintenance personnel ("toll the truck") to the house in order to examine the wiring, and repair it. This is expensive, time consuming and requires coordination with the residents to ensure that someone will be home.

To provide standard wired telephone service, outside a given residence the particular pair of wires that provide service to that residence is exited from the bundle and brought to the house, where it is attached to the in-house wiring. When additional service is required previously unused pairs must be employed. If there is not an unused pair which has already been brought to the house from the bundle, then an additional pair must be brought in. Again this requires maintenance personnel, on-site labor, and coordination with the residents. If there are no unused pairs available to bring to the house, this can cause significant delay to the resident requesting the new service, and expense to the telephone company which may have to provide new capacity to the area.

Telephones inside the home may be wired or wireless, with wireless phones requiring a dedicated base station. These are generally more expensive than wired phones, since they contain additional dedicated hardware required to communicate through radio frequencies with the handset. Further, these phones draw more power than a plain old wired telephone, and generally require power drawn from a different electrical system (e.g. home electrical wiring). In order to provide service during power failures, these must have battery backups.

Additionally, wireless phones share a disadvantage of wired phones connected to the same pair; that is, that a conversation held on one wireless handset is audible to anyone listening on another telephone, wire line or wireless, connected to the same pair. With existing systems, there is no way to guarantee privacy of conversation when multiple phones are connected to the same pair.

With a dedicated pair, the user is guaranteed a connection path to the central office. With that dedicated pair, and traditional phone service, the user is guaranteed only one connection path to the central office. There is no additional capacity available on a temporary, ad hoc, basis. For example, if someone is using the phone for a voice conversation or a computer connection, no outbound or inbound calls can be established. PBXs, e.g. as used by hotels, have a similar problem. Frequently, hotels serving large groups such as business meetings or conventions find that all their outbound toll lines are in use. This generates customer annoyance and frustration, as many users find themselves unable to make a phone call.

This dedicated resource service design has disadvantages for the carrier as well. Despite high demand, the carrier cannot easily offer additional services such as shared lines, temporary excess capacity, and new subscriber access. The carrier cannot extend even best effort services to users desiring it. In an area where many twisted pairs may be temporarily idle, the carrier cannot use them to offer service since they are dedicated to absent users.

Cellular telephony has the advantage that no wires need be run to the neighborhoods at all, let alone the home. Cellular does not allow for the adhoc addition of outbound or inbound connections. Additionally, cellular uses a relatively rare and regulated resource—frequency spectrum, which does not exist in unlimited quantities. In many jurisdictions the local exchange carrier will not be able to offer this service, without a cellular license.

Telephone service in the local neighborhood has not allowed for flexible business arrangements. Service has been on a dedicated line basis, or in past years, on a party line basis as mediated by the good conduct of neighbors. Life line services (i.e. services with high reliability that are always there, like "911"), and non life line (i.e. services that might not always be available, e.g. on power surges) billing models have not been offered. Such services as the following have not been enabled:

1) multiple simultaneous call capability (e.g. different calls to different phones within a household) with only one phone number, both inbound and outbound.
2) best efforts telephone connections based on availability of one of a pool of lines back to the central office.
3) auctioning for available telephone resource.
4) premiere or gold services (e.g., next available line, or ability to interrupt existing conversations)

OBJECTS OF THE INVENTION

An object of this invention is an improved apparatus, system, and method for connecting a network to one or more radio frequency channels.

An object of this invention is an improved apparatus, system, and method to enable multiple simultaneous call capability (e.g. different calls to different phones within a household) with only one phone number, both inbound and outbound.

An object of this invention is an improved apparatus, system, and method to enable multiple simultaneous call capability with privacy.

An object of this invention is an improved apparatus, system, and method to enable premiere services (e.g. next available line, or ability to interrupt existing conversations).

SUMMARY OF THE INVENTION

A wireless device connects to one or more network node devices that are in turn connected to one or more wirelines. The wireless device has one or more wireless signal generators supporting one or more of the wireless connections and one or more memories to store an identifier. One or more negotiators negotiate with the network node device in order to establish a connection to one or more wirelines connected to the network node and a requesting process requests bridging to a call in progress.

BRIEF DESCRIPTION OF THE FIGURES

The foregoing and other objects, aspects, and advantages will be better understood from the following non limiting detailed description of preferred embodiments of the invention with reference to the drawings that include the following:

FIG. 11 is a depiction of the elements of a class of service table associated with a PIN number in the Network Node.

FIG. 12 is a depiction of the line assignment table in the Network Node

FIG. 13 is a flowchart of the privacy process covering what happens in the wireless communications chart and in the network node command channel when privacy is requested for a call.

DETAILED DESCRIPTION OF THE INVENTION

Figure 1:
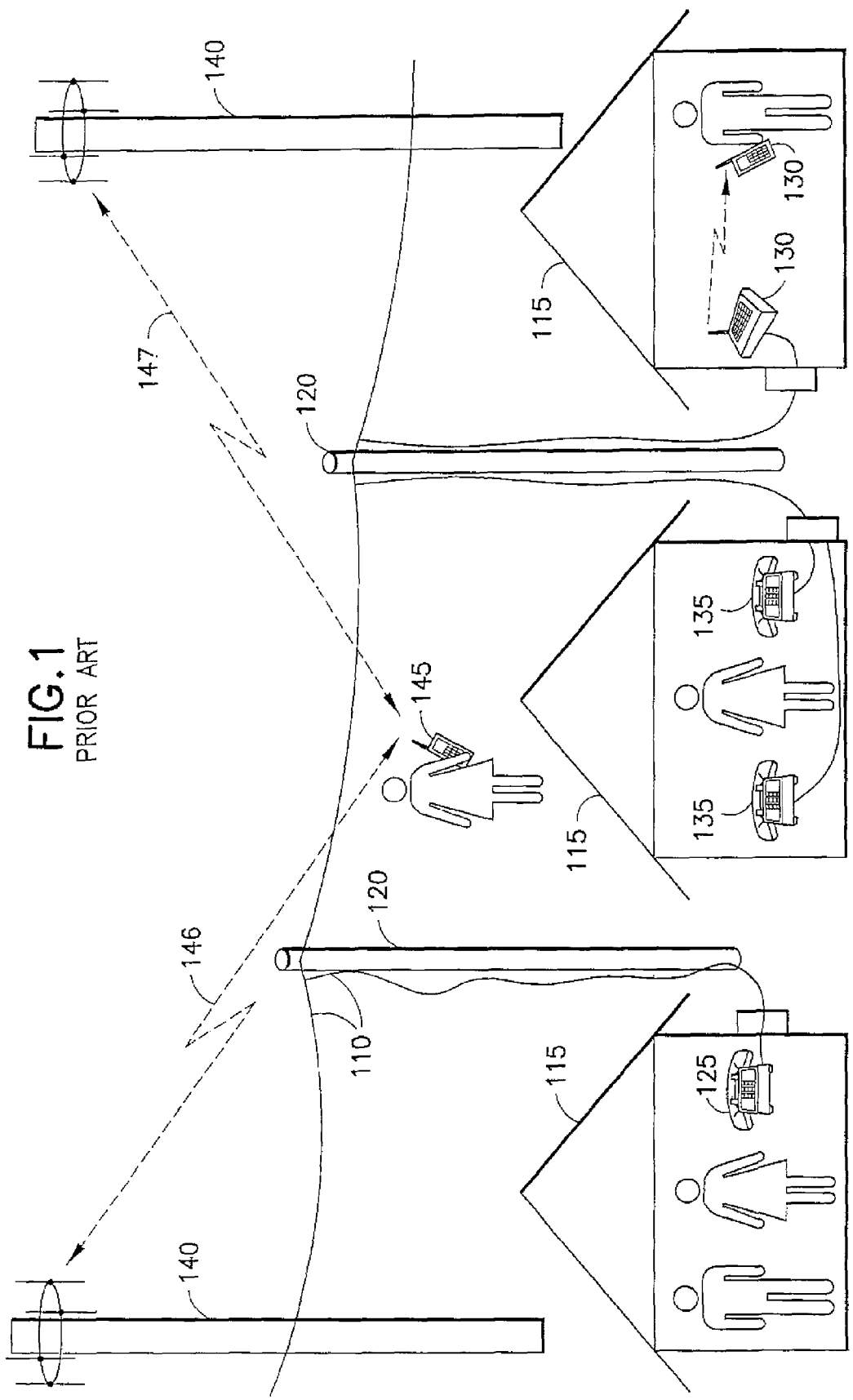
FIG. 1 is a block diagram of the prior art.
Figure 2:
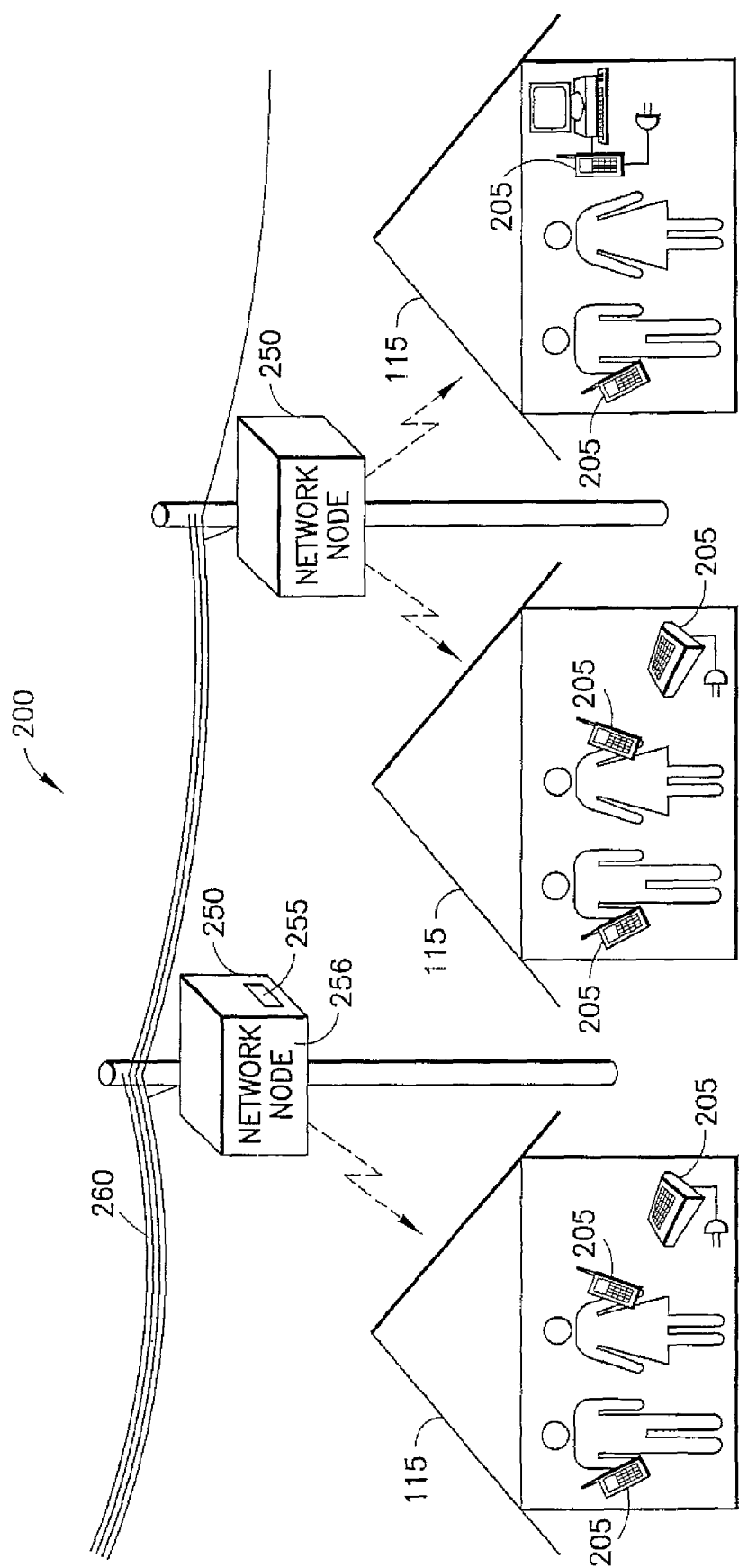
FIG. 2 is a block diagram of a system of network nodes and wireless communication devices.

Refer to FIG. 2. The system 200 comprises multiple wireless communications devices 205, most of which will be wireless handsets similar in appearance to present-day cordless telephones, although they may also be made in stationary versions which provide speakerphone functions, and versions which provide the function of modems. Numbers of wireless communication devices connect by radio or other emissions (laser, infrared light, etc.) to nearby Network Nodes 250 over short distances (in one preferred embodiment about 300 meters/1000 feet). The network nodes provide the connection between the wireless devices and groups of telephone landlines 260 which extend from the node 250 to a telephone central office. There are several classes of telephone landlines 260:

1. Associated lines are identical to ordinary two-way central office lines, and typically have a telephone number associated with them.
2. Unassociated lines are incoming-only to the telephone office (outgoing from the network node) and can be temporarily associated with any wireless device.
3. Shared lines, which are outgoing from the telephone office (incoming to the network node) and can serve multiple wireless devices. These are essentially ground-start PBX trunks on which the central office communicates to the network node the desired destination with DTMF tones.
4. Data lines, which allow the network node to communicate with Network Node Controllers in the telephone office. Data lines can be dedicated wires or can be "derived" by data-under-voice techniques applied to either associated or unassociated wire-pairs. Data lines are used to deliver operating data and programs to the network nodes 250, including the PIN 255 numbers of the wireless communication devices 205 authorized to interact with the node 250 and the "class of service" values associated with each PIN, which describe which optional features each PIN-bearing device may use.

The PINs and class-of-service marks 256 are stored in the nonvolatile storage of the network node 250. In the preferred embodiment, classes of services supported include dedicated line service, shared incoming line service, shared outgoing line service, bridging and privacy. Refer to FIG. 11 for one possible arrangement of a database table relating a PIN to a number of class-of-service marks. While each individual wireless device will typically contain one unique PIN, we do not prohibit the sharing of a PIN among multiple handsets, making them interchangeable and indistinguishable to the node, nor the application of more than one PIN within a handset, creating a multi-user set.

The PIN number 255 identifies the handset 205 to the Network Node 250, and the node 250 uses the PIN of a handset requesting any service to determine if the handset is authorized to receive that service. In a preferred embodiment, as a critical identifier, the PIN is not sent in the clear, it is encrypted. In the preferred embodiment, the handset is manufactured without a PIN, but with the ability to receive a PIN either via it being entered on the keypad, or by receiving it encoded on an installable nonvolatile storage device, e.g. a memory stick or PCMCIA memory card. The advantage to the removable media approach is accuracy by eliminating human number-entry, and quick transfer of the PIN to a different handset should the original unit fail. In some embodiments, the PIN 255 can be provided to the handset 205 through the node 250. An alternate embodiment is that the wireless device is manufactured with a unique hardware identifier.

Figure 8:
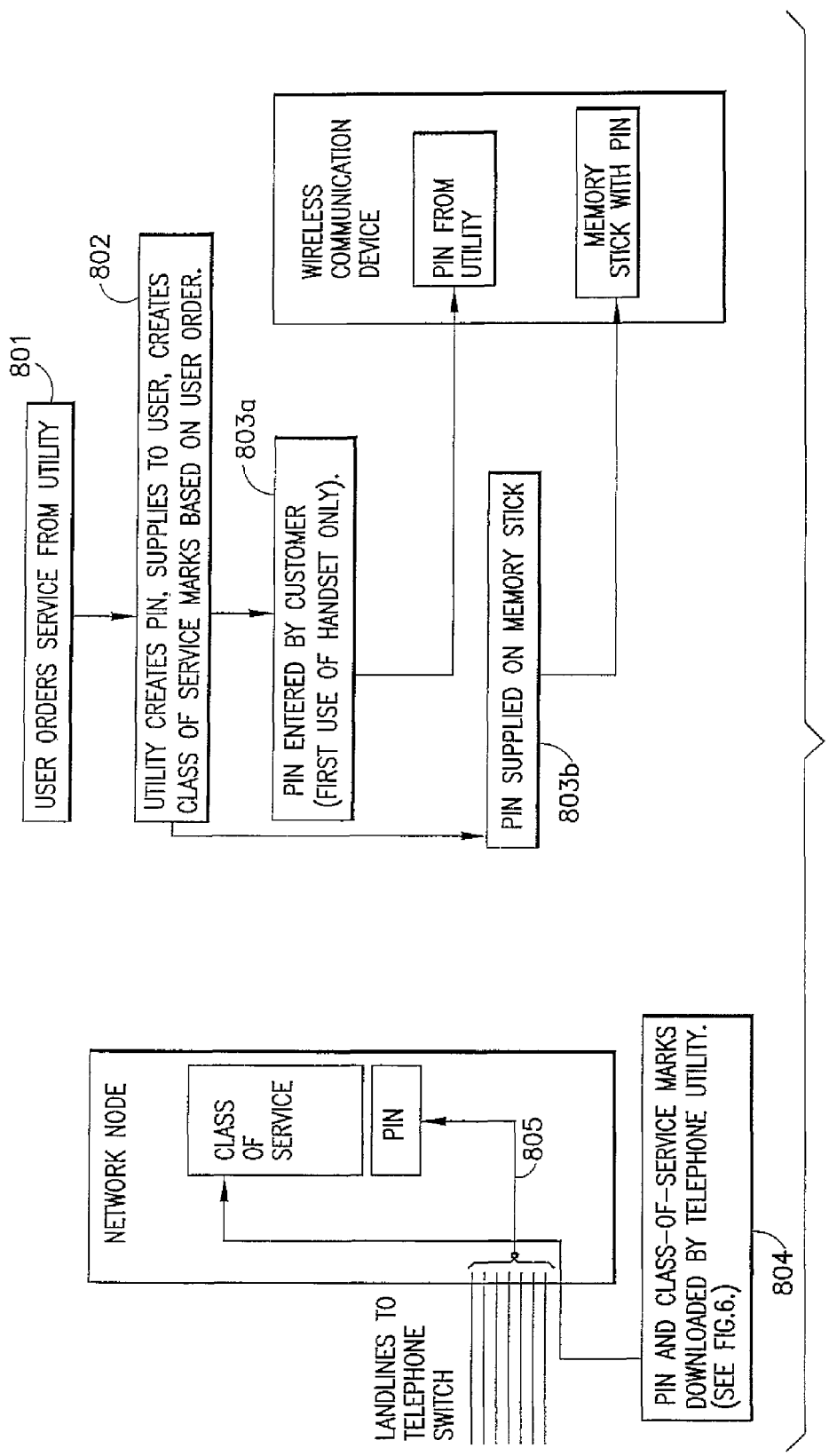
FIG. 8 is a flow diagram of the initial setup of the PIN into the Network Node and the Wireless Communications Device

Referring to FIG. 8, one preferred process of obtaining the PIN is as follows: The user purchases the handset from any retailer. The user contacts the telephone carrier 801, serving the location where the handset will be used, typically a business or residence, by telephone, mail, or the Internet. The carrier assigns the PIN, and creates a class-of-service database based on the subscriber's order for features, 802. The carrier provides the PIN to the user by telephone, mail or Internet, which the user installs by keystrokes 803a, or by the shipping of a removable storage device containing the PIN, which the user installs by inserting the device into the handset, 803b. The telephone carrier assigns 805 one or more land telephone lines to the PIN, or to a group of PINs (representing a group of extension telephones). This association of PIN(s) with telephone line(s) is stored by the carrier in the nonvolatile storage of the Network Node Controller 350. The telephone carrier also downloads the PIN and class of service information to the network node 250 which will serve the user, typically the node nearest the user's permanent location 804. Depending on the service offering, the carrier may download the PIN into more than one network node, e.g. all the nodes on a campus. In the case of a hardware PIN, the process is similar except that the user provides the PIN of the wireless device to the carrier and the carrier uses that number.

Figure 3:
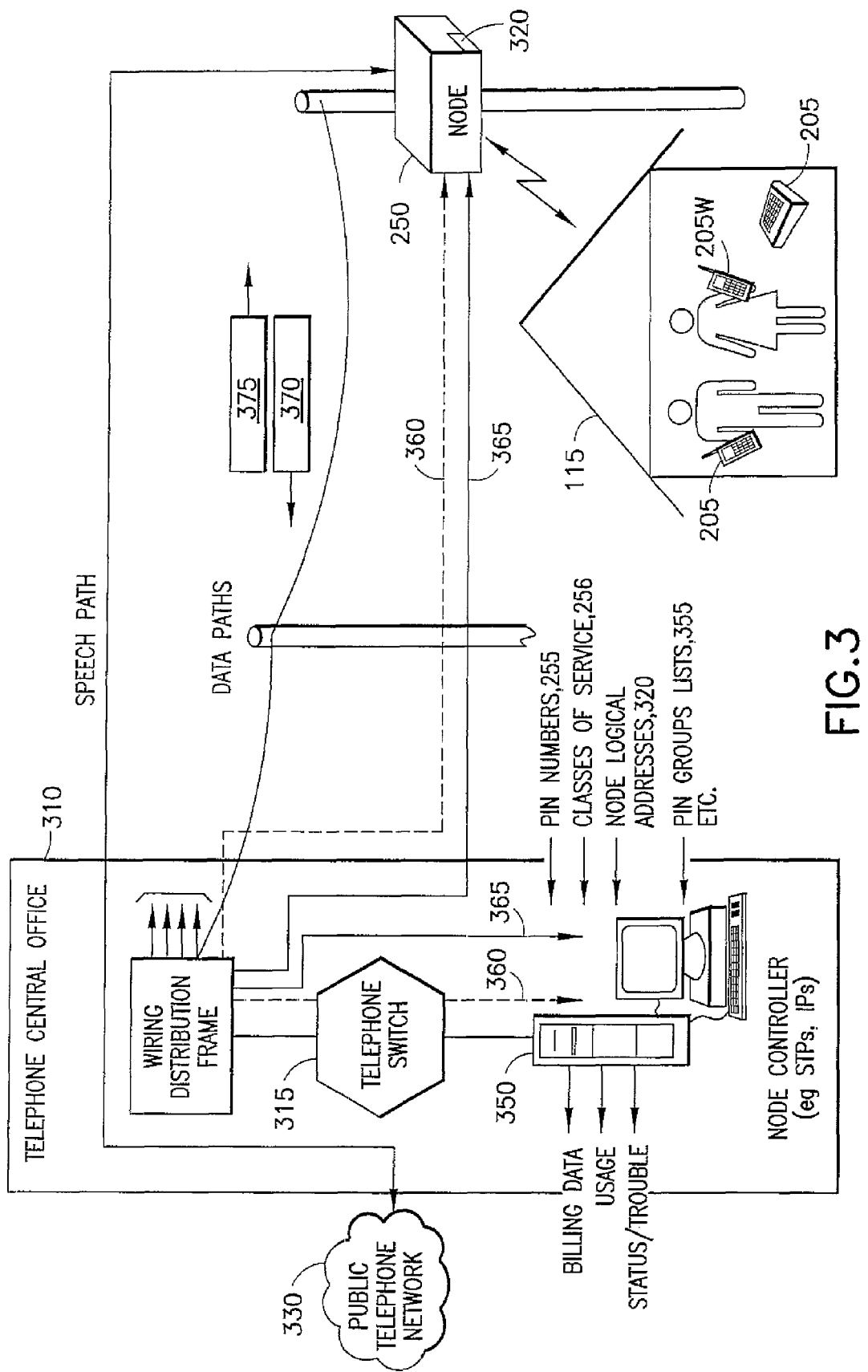
FIG. 3 is a block diagram of the Network Node Controller which connects the intelligent network to the inventive system.

Refer to FIG. 3. Multiple Network Node 250 devices are administered by one or more Node Controllers 350 located in the premises of the telephone service provider 310. As shown in FIG. 3, they are general purpose computers (servers) which may be connected to the nodes 250 by switched telephone lines (260, 360), or they may be connected by dedicated lines (260, 365), bypassing the switch element 315. The controllers 350 keep the PIN numbers 255, classes of service 256 associated with PINs, PIN Group lists 355 and node logical addresses 320, and can download the information 375 to the node 250 as required. They also receive alarms, statistics, and billing data and other node information 370 from the nodes. Connection to individual nodes may be periodic 360 or by a dedicated 365 line. When connected by a dedicated line, the node controller may be used as the grantor of all service permissions within the nodes, reducing reliance on the node storage. Network Node Controllers communicate with the Network Nodes using modem signaling, data-under voice techniques, or DTMF tones depending on the type of data line or other requirements.

Figure 6:
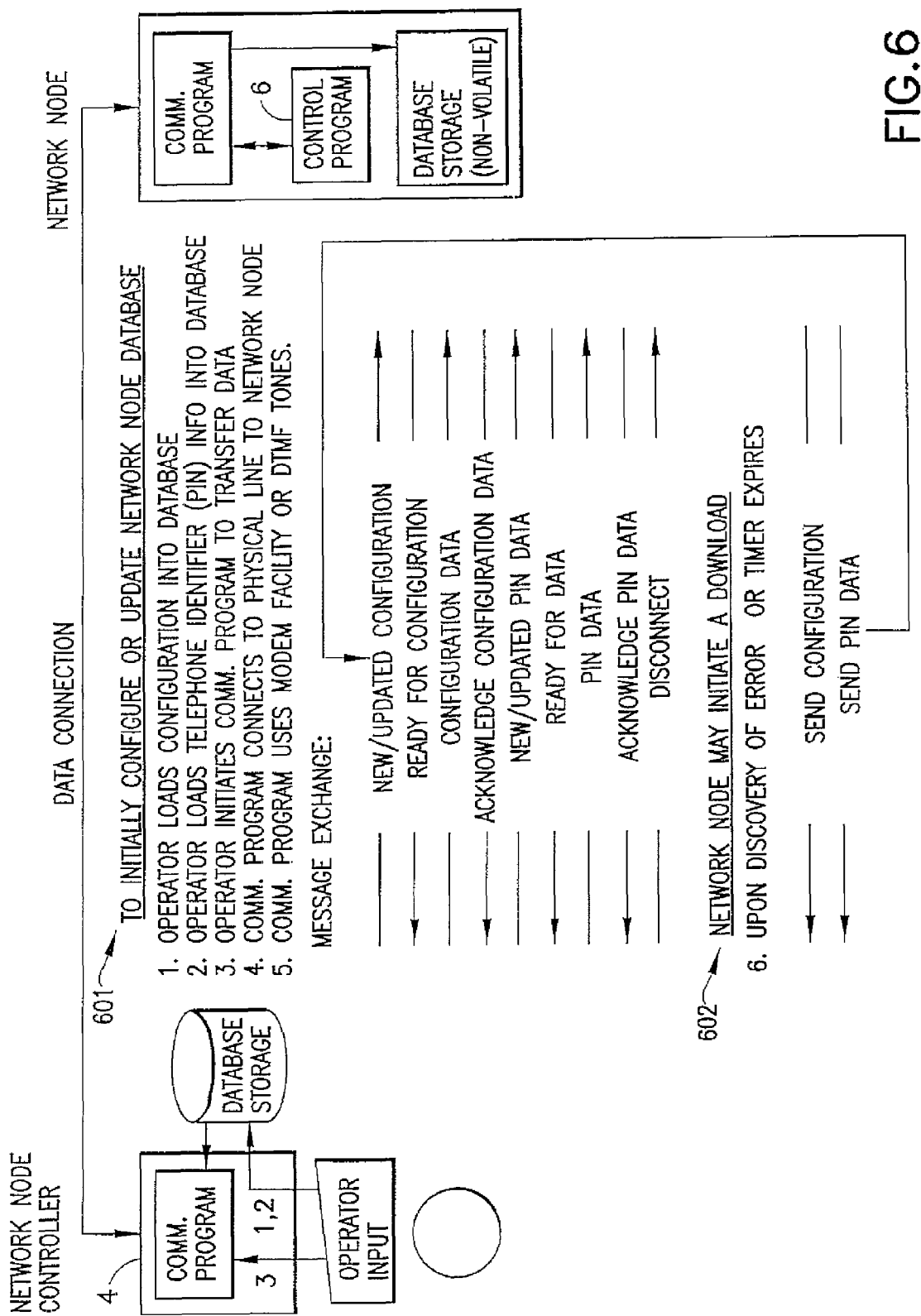
FIG. 6 is a flow diagram of the communication between the Network Node Controller and the Network Node device initiated by the controller.
Figure 7:
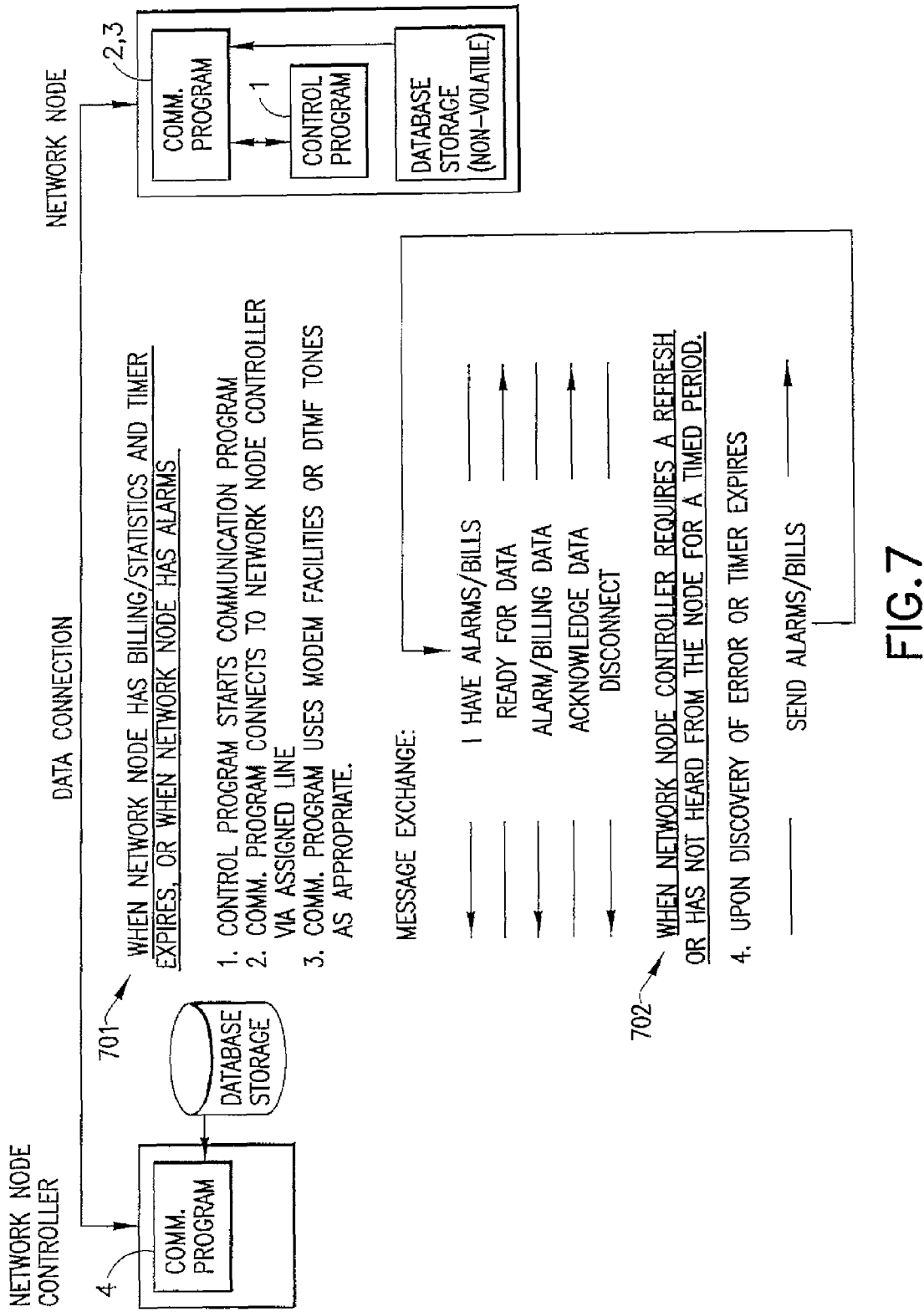
FIG. 7 is a flow diagram of the communication between the Network Node Controller and the Network Node device initiated by the Network Node.

As shown in FIG. 6 and FIG. 7 below, the Network Node Controller 350 normally initiates downloads of configuration and database 601, while the Network Node normally initiates uploads of billing, traffic, and alarm information 370, 701. Each entity, however, will have the ability to initiate any kind of transaction. For example should the Network Node discover a corruption in its database it will request a new download 375 from the Controller using a process like that described in 602, which will initiate the usual download 601. Likewise a Network Node Controller may use process 702 to initiate the download of alarms and bills when certain software triggers occur.

Figures 5, 5A, 5B:
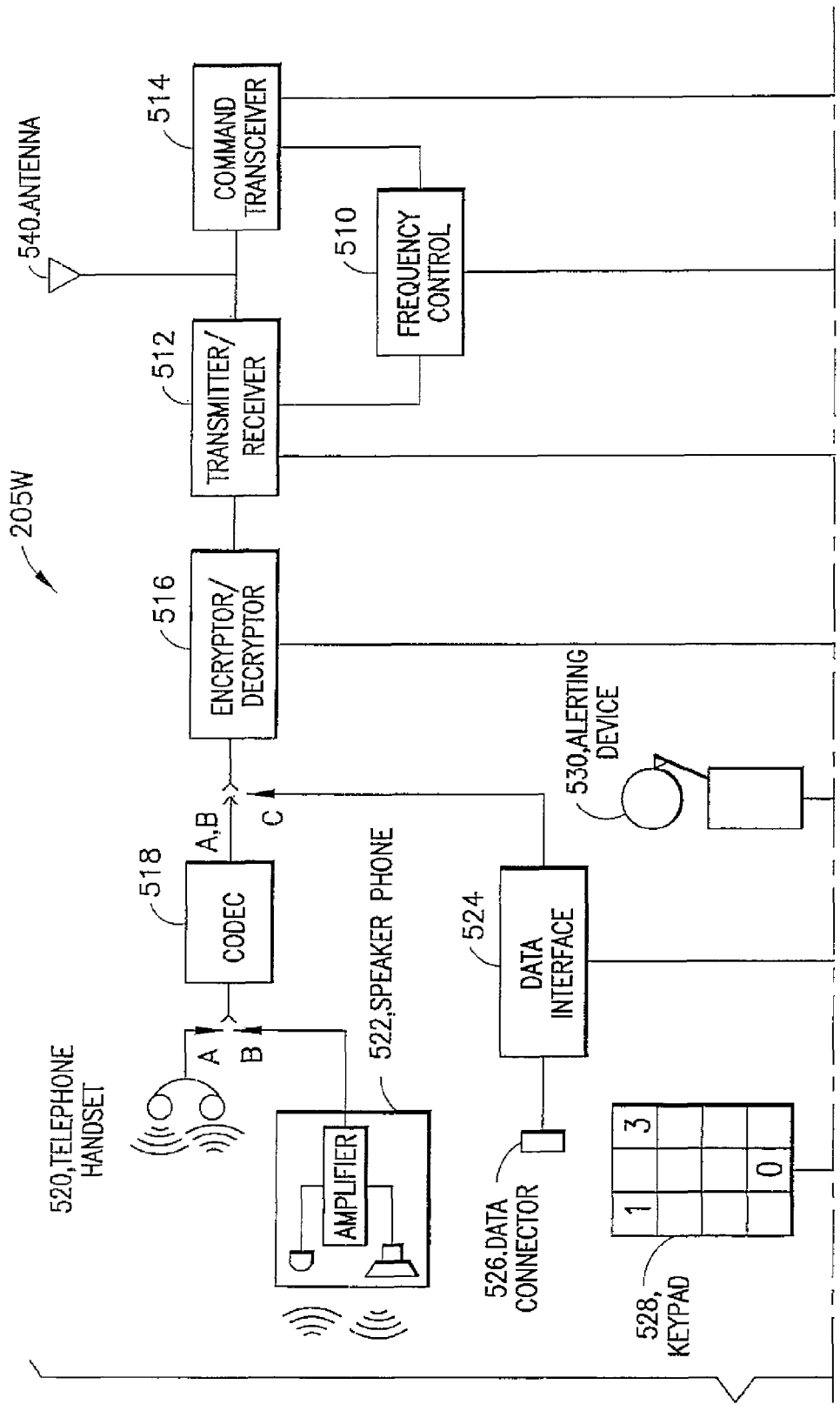
FIG. 5 is a block diagram of the Wireless Communications Device.
Figure 5B:
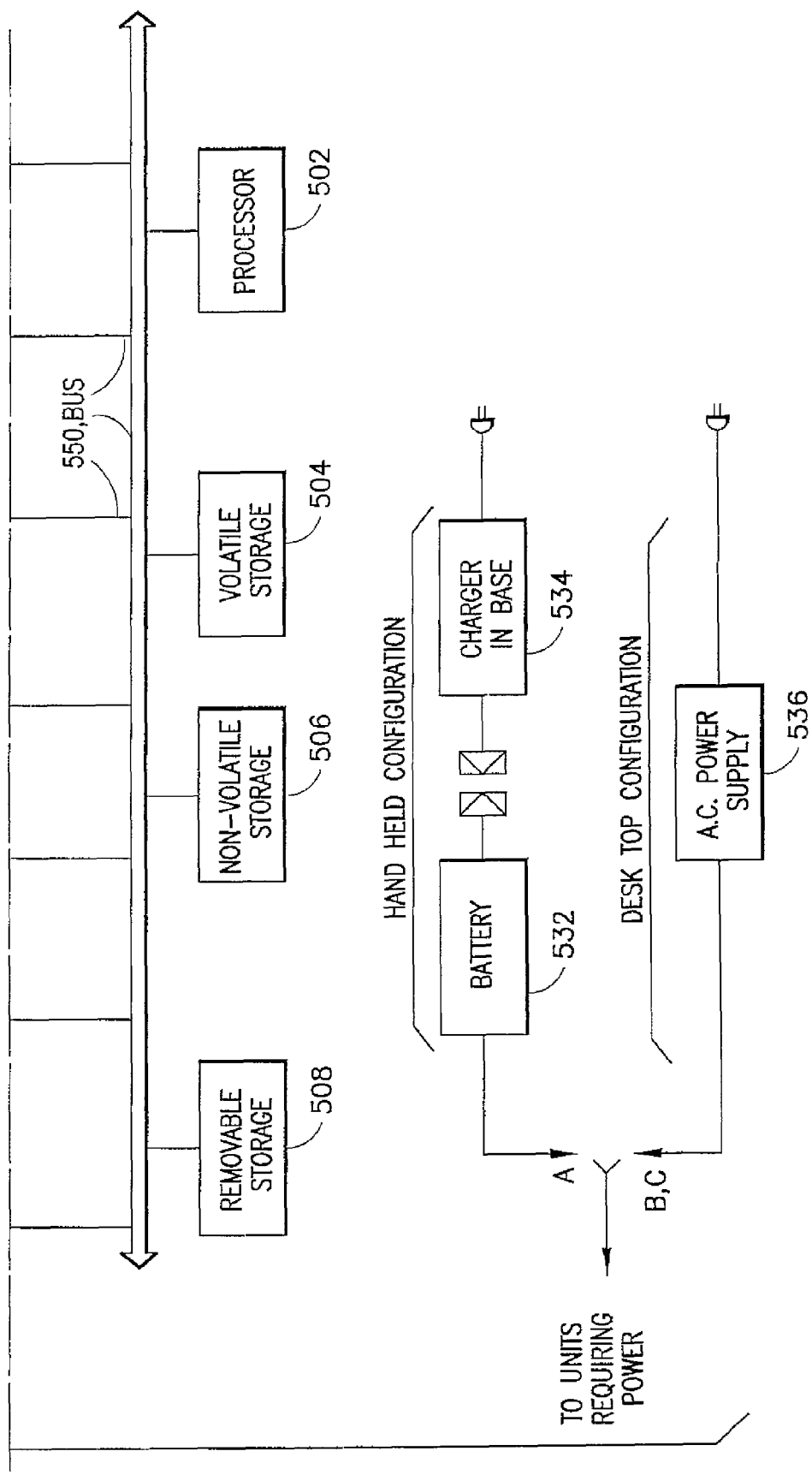

The purpose of the Wireless Communication Device (handset) 205W is to provide wireless speech or data communication to a wireless network node 250. FIG. 5 shows the components of the wireless device 205W, which in a preferred embodiment, may have three different configurations depending on the principal user interface: Hand held configuration A, Desktop Speaker Phone configuration B, and desktop data terminal configuration C. The data output components may also be included in either configuration A for use with portable data devices, or B for a combination desktop unit. In FIG. 5, capital A indicates optional connections for configuration A, capital B for configuration B, etc.

One "key" to the use of the device is the PIN number. The possession of a valid PIN authorizes the device to communicate with the pole-mounted network node, and reveals which optional services the client device is authorized to use. The client can obtain the PIN number by communication with the service provider, which provides the number either by voice communication (over the telephone), by mail, by communication over the Internet, or by providing a removable storage device with the PIN number pre installed. In the cases of the client obtaining an actual number, the client will use the keypad, 528, to install the PIN into the device, where it will reside in nonvolatile storage, 506.

All operations are controlled by the processor, 502, which connects by a data bus, 550, to all functional components. The processor employs three types of storage: volatile storage, 504, for temporary functions, nonvolatile storage, 506, for the computer control code and other information which must be kept when the power is off, and removable storage, 508, which may be any kind of removable storage, including plug-in PROM, Stick Memory, PCMCIA configuration storage card, Smart Card, etc.

Speech is received and transmitted by a loudspeaker and microphone in a handset, 520, or by the amplified loudspeaker and microphone in the speaker phone function, 522. Analog speech signals from 520, 522 are converted to digital signals in the codec, 518, optionally encrypted by the encryption function, 516, converted to radio-frequency signals by the transmitter/receiver, 512, and transmitted via a built-in antenna, 540. The frequency control unit, 510, determines which of the several radio frequencies the wireless device will use for a given call. In a preferred embodiment, each frequency selection consists of a fixed pair of frequencies, outbound for the transmitter and inbound for the receiver.

The data configurations include a data connector, 526, which allows connection of standard computer data ports to the data interface function, 524. Digital signals from the computer bypass the audio functions (connection C) and are connected to the encryptor for eventual wireless transmission as described above.

A keypad, 528, provides human-processor communication for entering the PIN, selecting functions to be used, etc., and also provides number-entry for outbound calls. Number-entry may be in the form of abbreviated codes which the processor translates into full digit strings.

When in a speech configuration, A or B, the processor alerts the user to incoming calls with the alerting device, 530, which typically is a bell or other audible signaling device. In the data configuration, C, the processor causes the data interface, 524, to change the state of the ring indicator lead to indicate an incoming call.

Before an incoming or outgoing call can take place, the wireless device and the network node must coordinate certain variables such as authorization, which radio frequency to use, etc. This coordination is done by means of the command channel, for which there is a dedicated command channel transceiver, 514. As there may be more than one command channel frequency, the transceiver is controlled by the frequency control unit, 510, which generates radio frequency carriers under processor control. During a call the command channel may be used to signal the desire of the user for additional features such as three-way calling, or to accept incoming requests such a call waiting.

In the hand held configuration the unit is powered by an internal battery, 532, which is occasionally recharged by placing the unit into a charger base containing an AC powered battery charger, 534. In the desk top configurations the unit contains an AC operated power supply, 536, which plugs into local power mains.

Figures 4, 4A:
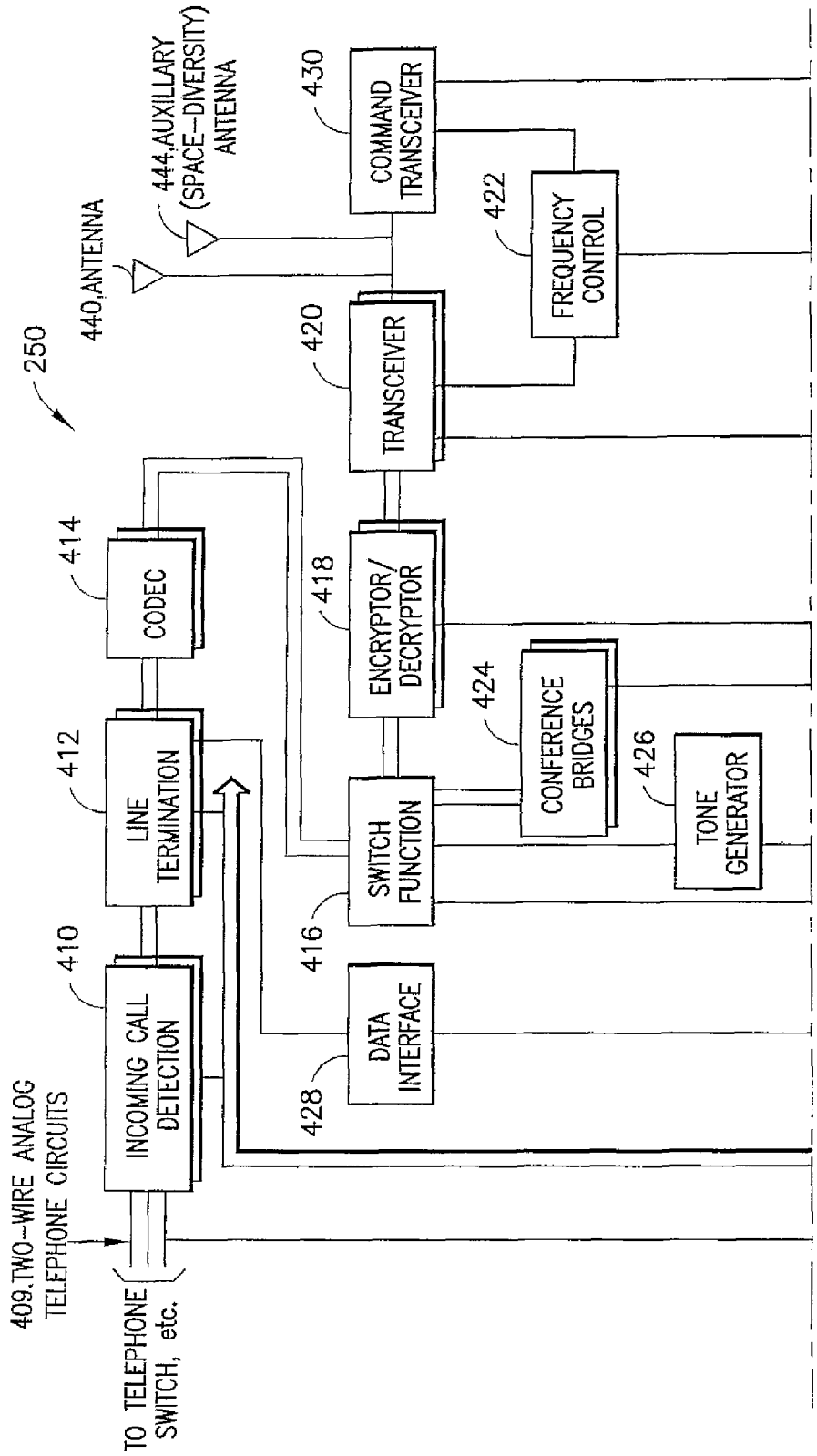
FIG. 4 is a block diagram of the telephone Network Node Device.
Figure 4B:
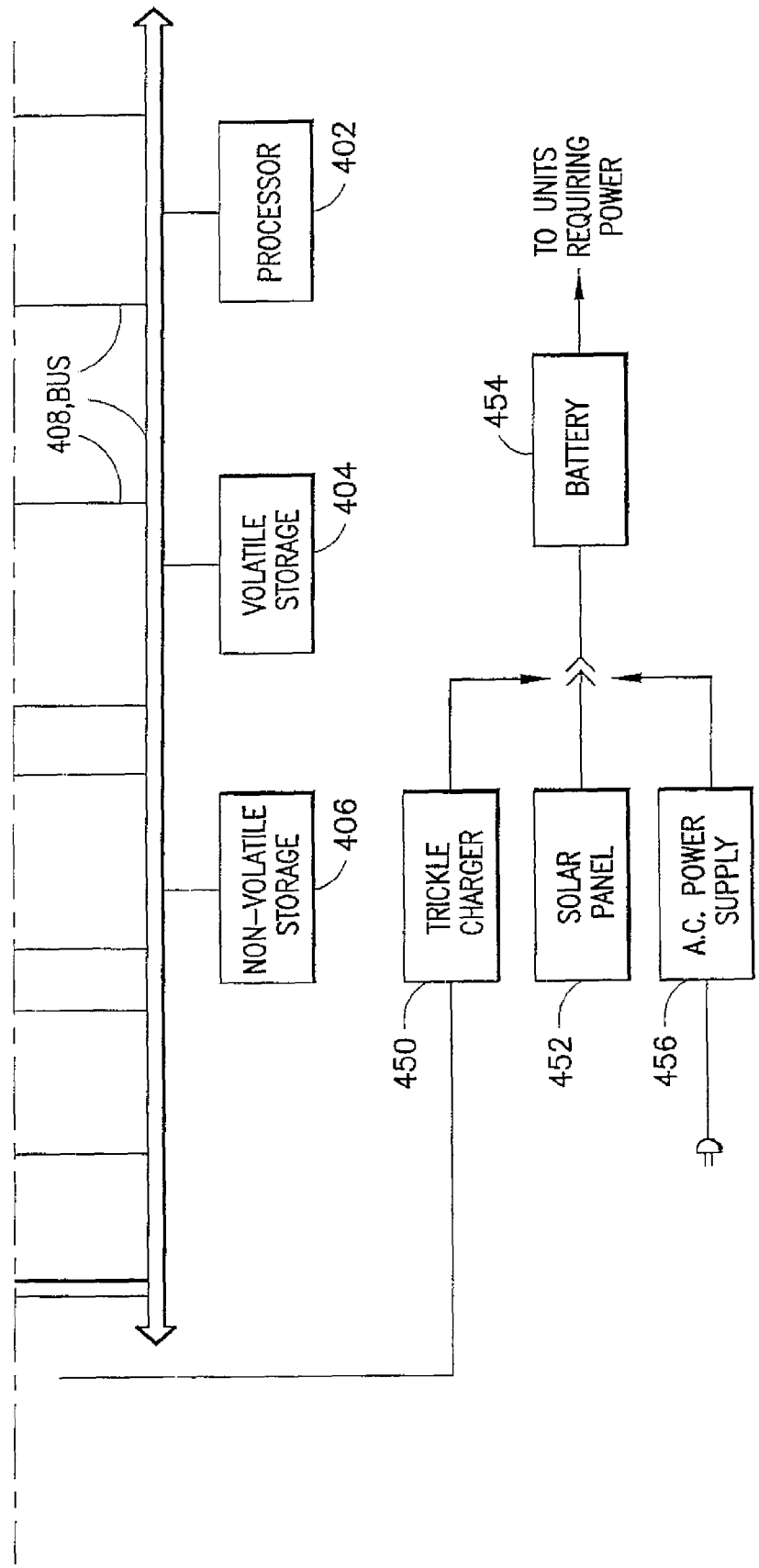

FIG. 4 shows the components of the network node 250. The network node provides a wireless connection between a number of land telephone lines and a number of instances of the wireless communication devices (handsets) (205, 205W) in a way that provides service like that which would be obtained if the handsets were connected to the land lines by physical wires.

The network node is connected to a number of two-wire analog telephone lines, 409, which originate in a telephone central office switch or its equivalent. The lines are physically similar but are in three logical classes: 1) Two-way lines associated with service to a specific handset or group of handsets, 2) Outgoing lines which may be assigned to any handset to provide outgoing service, and 3) lines dedicated to data communication between the central office and the network node for control, administration, and maintenance.

The incoming call detector, 410, detects ring voltage on the telephone line and alerts the processor that service is required on the line.

The line termination, 412, provides a processor-controlled d.c. shunt across the telephone line. On incoming calls the central office sees this as a telephone being answered and will stop ringing and connect the voice path to the caller. On outgoing calls the central office sees this as a telephone going "off hook" and will provide dial tone. The shunt termination has high a.c. impedance so that voice frequency signals pass through with little attenuation. The termination includes a dc current detector so that signaling from the central office in the form of loop interruptions can be detected by the processor. This allows the processor to detect calling-party disconnection in central offices that provide a "wink down" signal.

The codec (coder-decoder), 414, converts the analog signals on the telephone line into digital signals which may be more easily processed in the node.

The switch, 416, which may be a non blocking, any-to-any cross point switch or a bus technology, provides flexible interconnection among the telephone lines and the radio frequency assets of the node, and allows the tone generators and conference bridges, which ale not needed on every call, to be pooled and inserted into calls where necessary.

The optional encryptor/decryptor, 418, provides encryption of the digital signal coming from the codec (codec outputs are recognized standard formats) to ensure privacy to the users from eavesdropping in the radio frequency domain.

The transmitter/receiver, 420, converts the digital speech signal into radio frequency signals for broadcast to the handset. The receiver also monitors if carrier received from the handset and notifies the processor if it should be lost. One transmitter/receiver set is required for each handset in use.

The frequency control function, 422, allows the processor to select the radio frequency channel to be used by each radio frequency device in the node.

Conference bridges, 424, allow the processor to connect one or more telephone lines to one or more radio frequency links and provides the ability for the three or more parties so connected to converse normally. This allows extension telephones and conference calls. Because the handsets may not conference speech by transmitting and receiving on the same radio frequencies, the bridge provides the necessary signal combining.

The tone generator, 426, allows the processor to send (through the switch function) signaling tones to selected telephone lines for call control.

The processor may connect the data interface, 428, to a telephone line to communicate with external servers for the purpose of delivering maintenance information and alarms to a central maintenance function, call records to a central billing system, and for receiving databases or updates to databases, and computer programs or updates to computer programs.

The command transceiver, 430 provides a special radio frequency link to all the handsets (205, 205W) served by a particular network node device 250. The processor and the handsets use this link to initiate all calls and to interrupt/reconfigure calls in progress. Special identity codes (PINs) in the short data messages on this link allow each device to recognize the intended recipient of the messages.

The radio frequency transmitters and receivers are connected to a common antenna, 440, and optionally to an auxiliary space-diversity antenna, 444.

The processor, 402, provides control for the network node 250. It communicates with individual functions via a bus, 408. The processor operates from programs contained in the volatile storage, 404, which are backed up in the nonvolatile storage, 406. Other information contained in either or both storage devices are 1) the status of all functions, 2) lists of PINs authorized to use this node, 3) lists of functions each PIN is authorized to use, also called class-of-service marks, and 4) call records and statistics. Call records are precursors to telephone bills, and the generation (or not) of a record on any specific call can be controlled by the class-of-service marks for the PIN(s) involved in a call.

Power for the node is provided by a battery, 454. The battery may be charged by an a.c. power supply, 456, or a solar panel, 452, or by a charge circuit, 450, which draws power from one or more telephone lines. The charge circuit is set to draw current just less than that which would trip dial tone from the central office.

Figure 10:
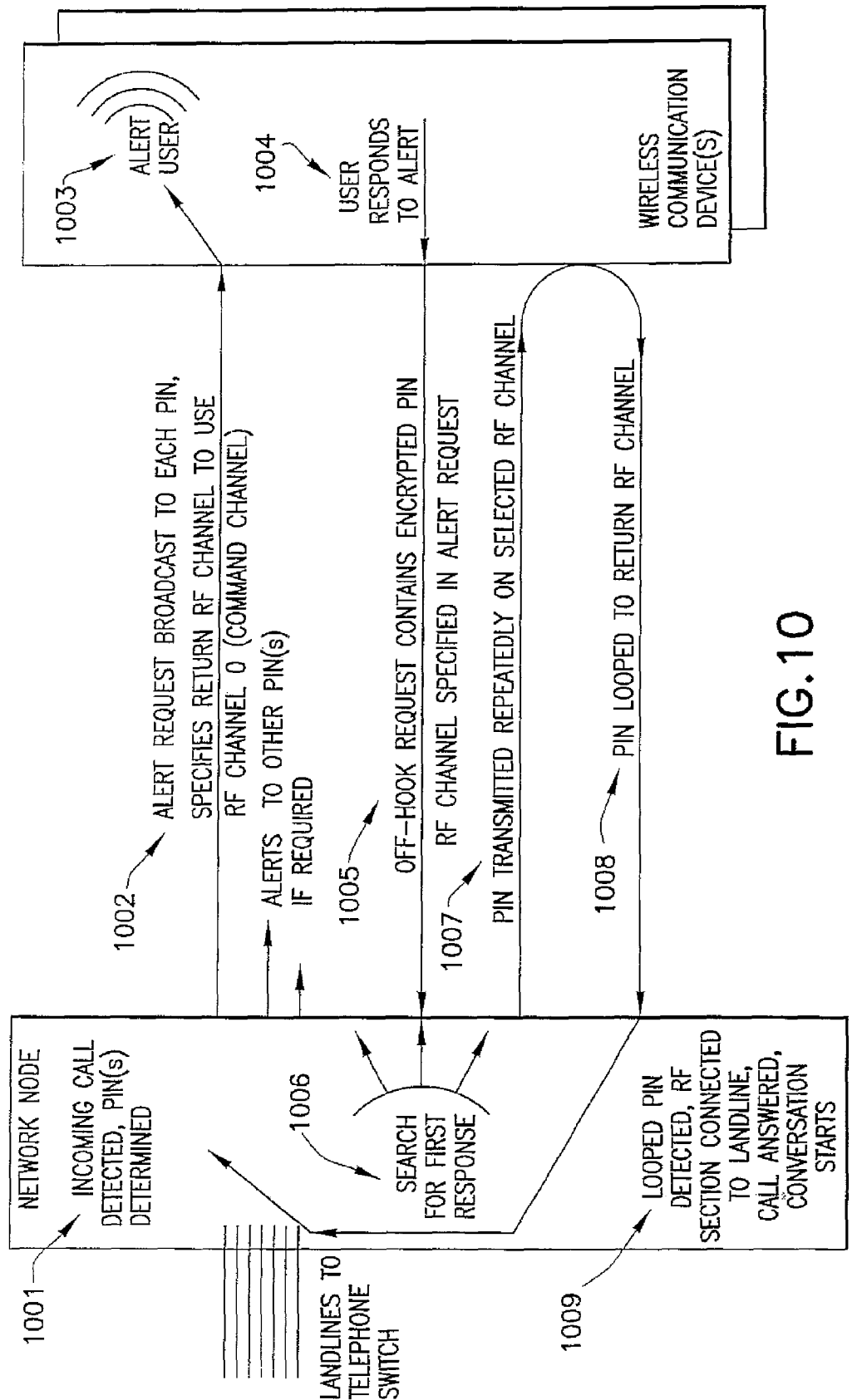
FIG. 10 is a diagram of the incoming connection process from the Network Node to the Wireless Communication Device.

Incoming call operation is described further in the below FIG. 10 flow diagram. Each incoming line, 409, is related to a destination, which in the case of the node is one or more wireless telephones, each with a unique PIN number. The PIN numbers and the telephone lines associated with them were downloaded to the node from a server in the telephone office. The central office indicates an incoming call by placing ring voltage (typically 90 volts 20 Hz) on the telephone line, superimposed over the nominal 48 volt d.c. loop voltage. The incoming call detector, 410, recognizes ring voltage and interrupts the processor via the bus, 408. The processor indexes the incoming call detector number into an assignment table in storage, 404, 406 to determine the PIN(s) associated with this telephone line. The processor selects an idle transceiver, 420 and also selects a number of idle frequencies equal to the number of PINs 1001. Using the command transmitter, 430, the processor sends a multicast or several unicast messages 1002, to the PINs instructing them to alert (ring the phone) 1003 and giving each a unique frequency to transmit back to the node if that handset's operator presses the answer key. The processor then begins to scan the set of return frequencies 1006 using the frequency control, 422, to the chosen receiver, 420.

Should no handsets answer the alert, the calling party will eventually disconnect. Ring voltage will stop, indicating to the processor (via the incoming call detector, 410) that alerting should be stopped. If the caller disconnects during the 4-second silent period of the ringing cadence, the signal to the processor will be up to 4 seconds late, this is a generally unavoidable aspect of using ring detection alone. If the telephone switch can provide ground start lines, the loss of the start signal can be detected instantly by the line termination unit, 412, thereby eliminating the ring window. Using either method of detecting caller disconnect, the processor will send "stop alert" signals to each PIN via the command transceiver, 430, ending the call attempt, and will free the reserved transmitter/receiver and return frequencies for use by other calls.

If one or more handsets answer 1004, each will begin to transmit earlier on its assigned frequency 1005. The processor will find one of these signals first, even if the handsets start simultaneously, because it scans the frequencies, preferably in a round robin 1006. The processor will establish the first received PIN as the answerer, and will begin a handshake with that PIN to establish the node to handset frequency to be used. The processor will transmit a code on that frequency 1007, and look for the code to come back on the receiver 1008, indicating the handset is tuned properly and that two way voice communication will be successful.

When communication is established with the handset 1009, the processor causes the line termination unit, 412, to place a d.c. shunt across the telephone line, which causes the telephone central office to stop ringing and connect the calling party's voice path through to the line. Voice frequency signals will pass through the line termination unit to the codec, 414, and the digital output of the codec will be connected via the switch function, 416, to the encryptor, 418, associated with the selected transceiver, 420. The transceiver converts the voice to radio frequencies which are broadcast by the common antenna, 440, 444, to complementary functions in the handset.

The carrier may associate more than one telephone line with a given PIN, or in the more general case it may associate more telephone lines with a PIN group than there are PINs in the group. This may be done by establishing a rotary group at the central office, or by assigning multiple telephone numbers to a PIN.

In any case it may be that a call arrives at the network node 250 when all associated PINs are engaged on other lines. When the processor indexes the line termination unit into its database it obtains the PIN(s) associated with the line. In a preferred embodiment, upon determining that all associated handsets are busy, the processor will momentarily break the inbound speech path of one or more connected handsets, and connect them momentarily to the tone generator, causing a 'call waiting' notification tone to be heard by the handset user(s). The method for selecting which handsets will be notified is determined by class of service marks, and can be all handsets, the handset with the longest or shortest time on the call, or other selections. Any user hearing the notification tone and desiring to answer the new call will press a key on the keypad, 528, indicating the desire to answer the call. The handset processor will recognize the key and send an answer request message via the handset command transceiver, 514, which will be received by the node command channel transceiver, 430, and passed to the node processor. The node processor will verify the PIN of the requesting handset and if allowed it will disconnect the requesting handset's encryptor/decryptor from its present connection which will be either 1) directly to a codec if the handset is the only one on the first call, or 2) the conference bridge if more than one handset is presently in conference on the first call. In instance 1 above, the node does not release the d.c. shunt on the first call's line termination, effectively placing the first call on hold. The node processor next answers the second call by operating the d.c. shunt in its line termination unit and connects the associated codec output via the switch to the encryptor presently associated with the requesting handset. If more than one handset responds to the call waiting tone, the node processor may ignore requests after the first, or may treat then as 'join' requests as described in the next paragraph.

Wired telephone installations usually provide extension telephones. The invention can provide an extension telephone emulation. If one handset is already involved in an incoming or outgoing call, the user of another authorized handset may use the handset keypad to send via the command channel, 430, a "join request" message to the node Upon translating the request the processor uses the PIN number to determine if the requesting party is authorized to make a join request, and if so, which existing call the user is authorized to join. It then checks to see if the present user on the call has a privacy code in the database (see next paragraph). If there is no privacy block, it selects an idle transceiver (an additional instance of 420) and frequency pair, transmits the frequency information to the joining handset via the command transceiver, 430, and executes a negotiation as described above. Once the radio connection is established, the processor uses the switch, 416, to divert the codec output to an idle conference bridge function, 424, to which it also connects both the original encryptor, 418, and the encryptor associated with the joining transceiver. The three parties can then engage in a call as if both handsets were extensions in a wired environment. A tone spurt may be generated by the tone generator and injected toward the original party(ies) to inform them that someone has joined the call.

Figure 14:
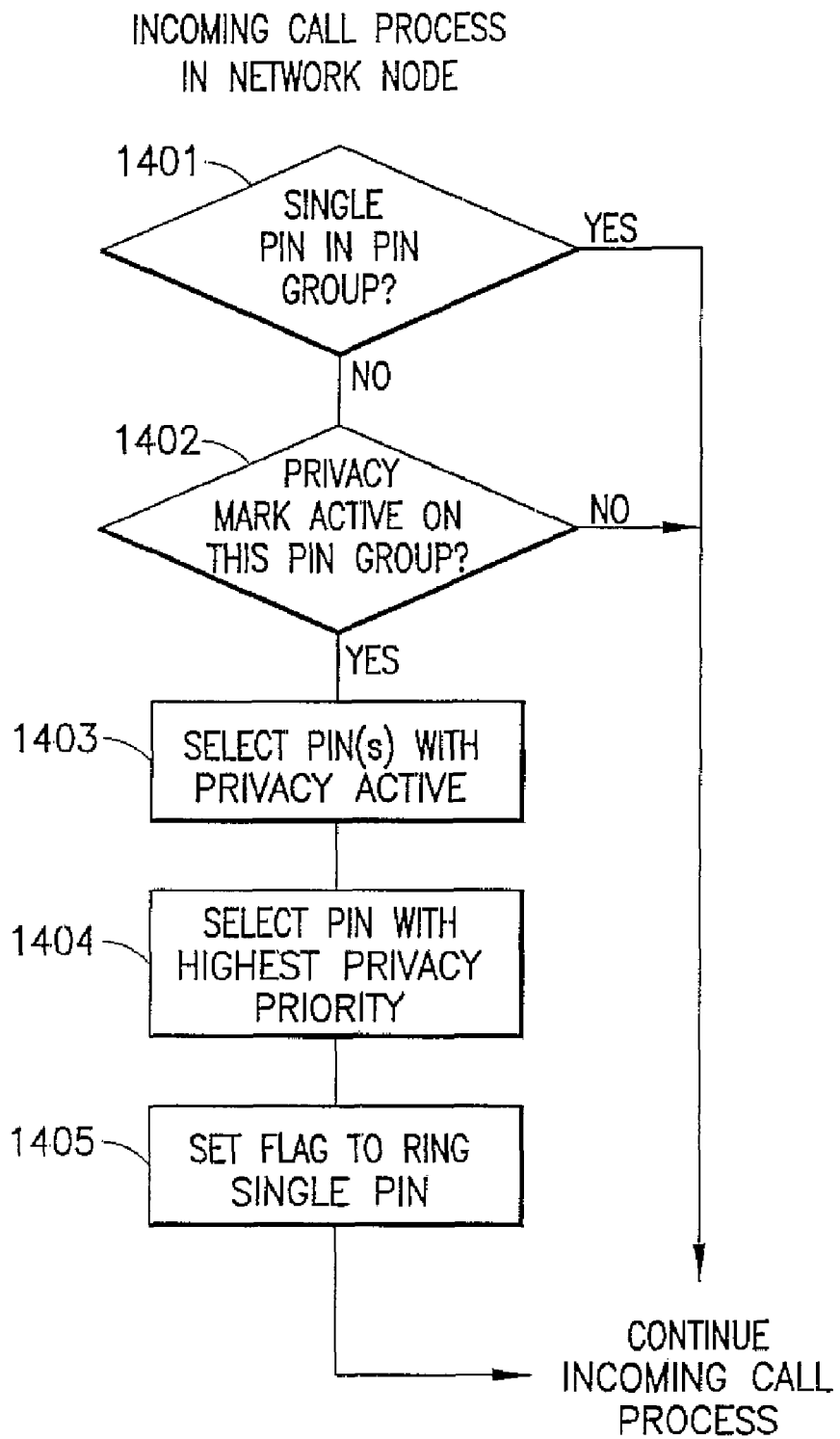
FIG. 14 is a continuation of the privacy process covering what happens in the network node incoming call handler when a privacy request is received.
Figure 15:
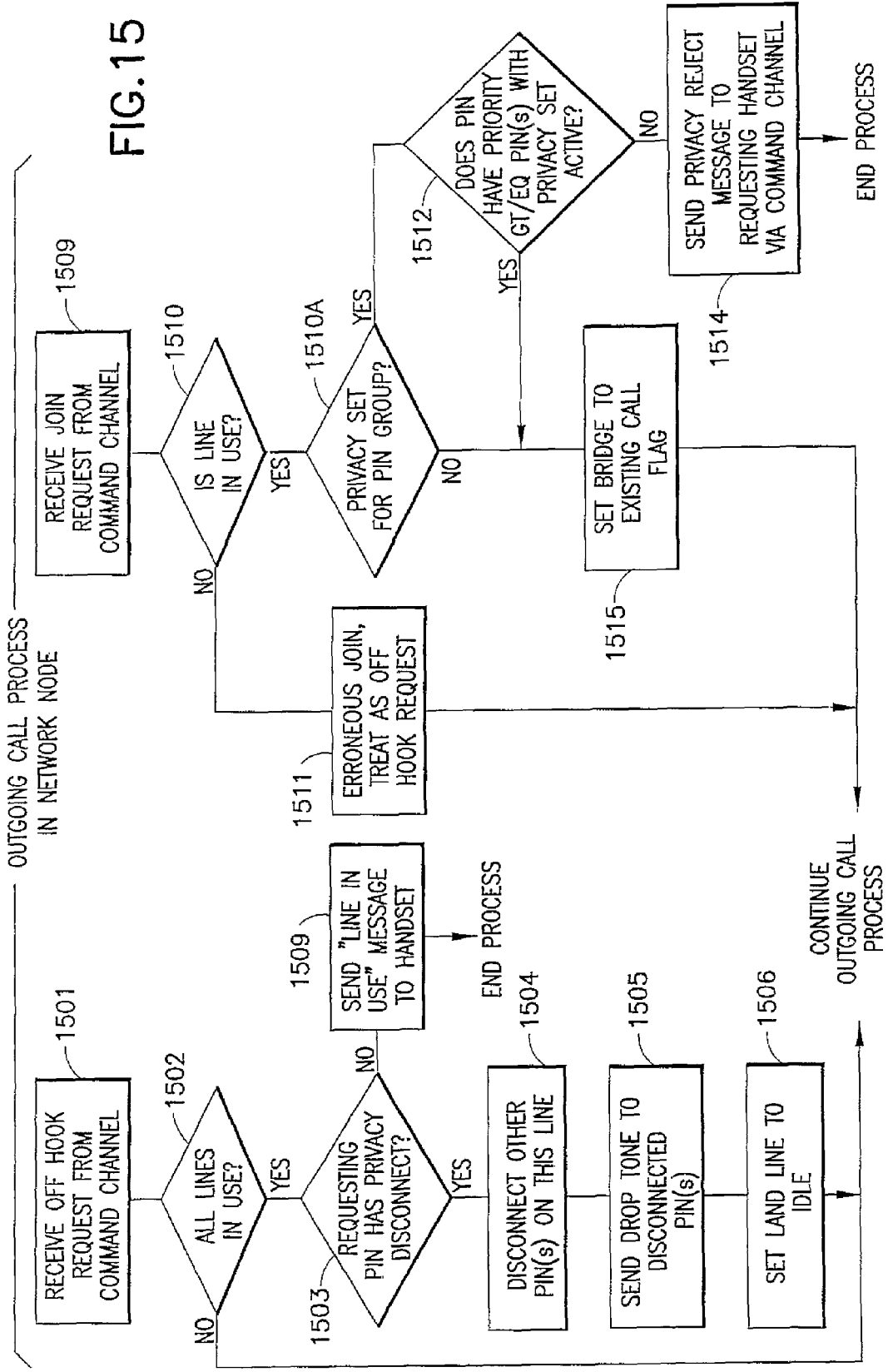
FIG. 15 covers the outgoing call process in the network node as it handles privacy.

For a flow chart of the "private" and "privacy disconnect" functions see FIGS. 13, 14, and 15. Extension telephones may represent a violation of privacy if used without the knowledge and consent of other parties on the call. The invention includes the ability of the wireless handset user to press a "private" key either during or before engaging in a call, 1301. The output of this key will cause the wireless handset to send a "private" message 1302 via the command channel 1303, to the wireless network node device 1305, where a privacy attribute may be stored in the database associated with the wireless handset's PIN, 1310. Step 1304 insures that the network node responds. If not, step 1303 is repeated. Step 1306 checks if the request is a privacy request. The attribute will only be stored if the PIN database includes authority to do so, as this feature may be optional. If engaged in a call 1307 when the key is pressed and the message recorded in the database, the network node may place a confirmation tone 1309 on the speech path to the handset, assuming the requesting PIN Group is idle 1308. If the PIN Group is not idle, control is passed to step 1311.

Step 1311 checks if the requesting PIN's privacy priority is greater than that of the pins in use. If it is, the PIN in use is disconnected 1312, the prior in use is connected to a drop tone 1313, and then set to an idle state 1314. If the priority in step 1311 is less than the PIN in use, than the requesting PIN is disconnected 1315, the connect requesting PIN is placed to a rejection tone 1316, and the requesting PIN is reconnected to the conversation 1317.

Privacy modifies the incoming call process as described in FIG. 14. In a single PIN environment 1401, this process is by passed. In a multi-PIN environment 1401 an incoming call will be delivered only to the highest-priority (1404) PIN which has a "privacy" attribute active (1402) in its database that are selected 1403. In step 1405, flags are set to ring the single PIN.

An outgoing call process, typically executed in the network node is shown in FIG. 15. First an off-hook request is received 1501 from a command channel. A check 1502 is done to see if all lines are in use. If not, the process is skipped and outgoing calls continue being processed. If all lines are in use, step 1503 requests if the PIN has a privacy disconnect. If not, a "Line in Use" message is sent to the handset 1508. If there is a privacy disconnect, other PINs on the line are disconnected 1504, a drop tone is sent to disconnected PIN(s) 1505, and the land line is set to IDLE.

When a join request is made 1509 to the node, a check is made to see if the land line is in use 1510. If the land line is not in use, the erroneous JOIN is treated as an OFF HOOK request 1511.

If the line is in use, the process checks if the privacy mode is set for the PIN group 1510A. If the privacy is not set, the BRIDGE TO EXISTING CALL FLAG is set 1515. (This flag tells the processor not to try to establish a new radio call, but only to bridge the user to a call already in existence.) The outgoing calls continue to be processed as usual. If the privacy is set, the process checks for the presence of a privacy attribute for the handset already in use 1512, i.e., does the PIN have priority greater than or equal to PINs with the privacy set active 1512. If the attribute is found, e.g., if the PIN has a priority less than the priority of PINs with an privacy set active, the process will not allow the requesting party to join the call 1514. This is done by sending a Privacy Reject message to the requesting handset via the command channel.

A member of a PIN group, the members of which share access to one or more telephone lines, may want to place a new call, rather than attempt to join a call in progress, or the new user may be prevented from joining due to privacy request on the call in progress. If no telephone line is available for the new user, the user's PIN may include authority to "camp on" and wait for an available line. The user presses a key combination indicating a desire to camp on, which is translated by the handset processor. The processor sends via the command channel a message to the network node indicating that the sending PIN should be notified when an authorized line becomes available. The node processor will place a mark on the lines in use (that the camping on party is eligible to use) so that when the first such line becomes idle, the node will alert the camped PIN as if a new call were arriving for it. This process is identical to the incoming call process described above. When the camped handset answers, the node will connect it to the telephone line, which will provide dial tone and allow the handset to place an outgoing call. If more than one PIN camps on to a (group of) busy lines, the allocation of lines as they become idle may be random, first-come-first-served, or a camp-on priority may be included in the class of service of each PIN so that certain PINs always have first choice of idle lines.

An additional function, privacy disconnect, is permitted. This constitutes the releasing of all other joined parties from the call if privacy is requested by a party on the call. If a particular handset did not have privacy established when it began a call, other authorized parties may have joined the call. To regain privacy, a handset user may press the privacy key 1301, sending a message to the network node via the command channel 1305. The processor will check the handset's PIN to determine if this function is permitted and if permitted it will release the other parties to the call 1312, freeing the conference bridge in use and returning to a direct codec-to-encryptor connection via the switch. The authority to drop calls, as contained in the PIN database, may be simple, as in anyone can drop anyone else, or may be hierarchical as in level 1 may drop all other levels, level 2 may drop only lower levels of authority, etc. 1311. An alternate procedure may be that another key "privacy disconnect" may be defined on the wireless handset keypad, and only this key, not the basic "privacy" key may cause disconnects. The privacy key would send a unique "privacy disconnect" message via the command channel to initiate the disconnect procedure described above. The term 'key' as used above may include keystroke combinations as well as single key actuations. It will also be possible to include in a PIN's class-of service the right to preempt calls in progress when the handset using that PIN requests an outgoing call 1501-1506. The process is essentially an automatic privacy disconnect that operates as soon as the PIN's class of service is determined by the node processor.

Figure 9:
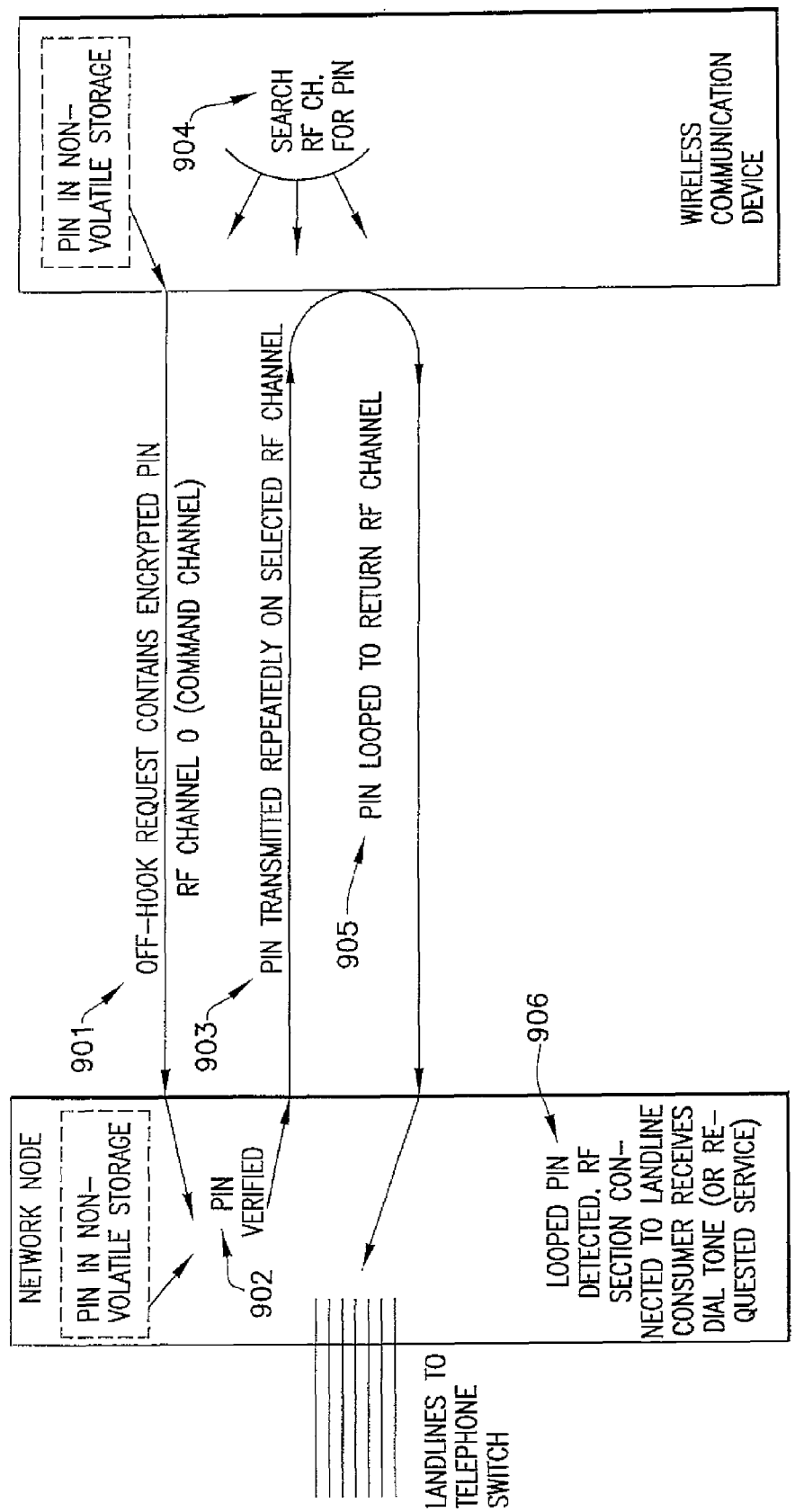
FIG. 9 is a diagram of the outgoing connection process from the Wireless Communication Device to the Network Node.

Note that outgoing calls are further described in the flow diagram of FIG. 9. The user initiates a call by pressing a keypad key to request service. The handset processor decodes the key and sends a "call request" message containing the PIN via the handset command transceiver, 514, 901 to the network node command transceiver, 430. The call request message contains only the encrypted PIN and a code to indicate which type of call is being requested, e.g. "New Call", or "Join". The network node processor translates the message and checks the class of service marks associated with the requesting PIN. If the class of service indicates that the requesting PIN is authorized to make the requested outgoing call 902, the node processor selects an idle transceiver, 420, and frequency pair, and begins to transmit the requester's PIN through the encryptor, 418, and transceiver, 420, 903. The handset scans receiver frequencies 904, and when it finds its own PIN, loops the signal back to its transmitter which broadcasts the looped signal back to the node receiver, 905. The node monitors the expected return frequency and when it finds the requester's PIN coming back it accepts the negotiated channel as working properly, and can proceed with making the connection to the telephone line, or another service as requested, 906. This handshake establishes the frequencies and checks the voice path without using the command channel. When the radio path is established the processor uses tables in storage to relate the calling PIN with a land telephone line. It seizes the line (goes 'off hook') by instructing the line termination to apply the d.c. shunt across the line. The central office responds with dial tone. Dial tone is passed to the codec, 414, and via the switch, 416, to the encryptor, 418, associated with the previously selected transceiver, 420, and over the antenna, 440, 444, to complementary functions in the handset. The user hears dial tone and presses keys on the handset which generate audible tones (DTMF) which are carried over the outgoing voice path to the telephone central office, which completes the call. The processor may or may not create a call record for connecting a wireless device to its dedicated line(s) depending on whether the telephone carrier uses flat-rate or message-rate billing.

Each group of PINs (handsets) have at least one telephone line (dedicated, shared, or both) associated with it for incoming calls. A line assigned to a single PIN represents a guaranteed line to that PIN, as no other PIN can use it. This invention can also provide additional outgoing lines to a PIN group so that if one handset is using the associated line, another handset can make an outgoing call via one of a pool of unassociated land lines connected to the node. The procedure is similar to that for an outgoing call, above, except that the processor checks for authority to add a line and if it is allowed by the class of service database, any idle unassociated land line, 409, will be selected for use. The processor will generate a call record which may result in a per-use bill to the user for this feature. It will be possible, through class-of-service marks, to limit the number of concurrent calls any PIN group may use, so that the shared resource represented by the set of outgoing lines may be fairly made available to all. Thus varying degrees of next-available service may be provided. It is also possible for the carrier to dedicate one of more outgoing lines to a specific PIN, providing a guaranteed number of bridged calls. This concept can be extended to include a priority system for assigning the idle lines, in which the processor compares the priority of any requesting user with a priority associated with an idle line, and only proceeding if the requester's priority matches that of the line. In addition a preemption priority system may be provided for allowing certain PINs to capture lines in use from PINs with lower priorities. Once a line is captured by a member of a PIN group, any other authorized features, such as join, privacy, privacy disconnect, etc., will be available to the other members of the group.

The physical facilities between the telephone switch and the network node may include trunks as well as lines. This allows the network node to take advantage of certain enhanced services available in the central office switch and allow multiple wireless handsets to share an incoming line. The switch knows if a specific dedicated land line is in use so it can roll to the shared trunk a second incoming call to that line, then use signaling to inform the node of the destination number. There may be multiple shared trunks to a given network node, and the central office knows which are available and can use any idle trunk. If no trunks are idle the central office provides busy tone to the caller. In this embodiment the Network Node performs additional functions when a call is initiated by the telephone switch. Upon detecting start (off hook) on any trunk, the incoming call detector, 410, interrupts the processor, 402, via the bus, 408. The processor connects the codec, 414, associated with the incoming trunk through the switch, 416, to an idle tone detector/generator. When this connection is made the processor causes the line termination to send a signal to the telephone switch indicating that the node is ready to receive destination information in the form of DTMF tones over the trunk. Some implementations of trunks may simply send digits after a time interval, eliminating the need for the response from the termination. In either case, the tone detector encodes received digits and sends them to the processor via the bus. The received digits will be the telephone number to which the telephone switch desires to connect. In effect, the trunk represents a shared line whose destination may change from call to call. Once the processor is in possession of the called number, it proceeds as in any incoming call, viz: it relates the incoming line (or, in this case, number) to a PIN and proceeds according to the class of service marks assigned to that PIN. At this point all features described earlier for incoming calls such as priority answers, privacy controls, and joining calls are possible. One possible arrangement for a database table which allocates shared and dedicated lines is shown in FIG. 12. Line 1201 shows a line which serves only (is dedicated to) PIN xxxx. Line 1202 shows how a line is dedicated to a group of PINs, in this case aaaa, yyyy, and zzzz. These 3 PINs have equal access to this line as if they were wired extension phones. Line 1203 shows a shared line which will be assigned to PIN bbbb if and only if the incoming code is xxxx. If the incoming code is yyyy, PIN cccc will be associated with this line for the duration of the call.

Line 1204 shows a second shared line, note that if the incoming code is xxxx this line can also be used by PIN bbbb, but PINs cccc and dddd are not allowed to use this line. Note that shared lines may be given a priority, P, which allows preemption and other service levels to be sold to the PINs sharing each line.

The invention claimed is:

1. A wireless device for connecting to one or more network node devices, the network node devices connected to a plurality of wirelines, the wireless device comprising:
   one or more wireless signal generators supporting one or more wireless connections;
   one or more memories comprising an identifier, wherein the identifier corresponds to identify the wireless device;
   a negotiator that negotiates with the network node device in order to establish a connection to one or more wirelines connected to the network node; and
   a requestor that requests privacy through one or more messages sent to the network node device, the one or more messages comprising the request for privacy and the identifier, wherein the request for privacy requests that the network node establishing said connection prevents bridging to other wireless devices that are configured as extension devices of said network node.

2. The wireless device of claim 1 further comprising the step of communicating with the network node device to establish the eligibility of the wireless device to join a call in progress.

3. The wireless device of claim 1, further comprising the step of communicating with the network node device to establish the eligibility of the wireless device to request privacy.

4. A method of establishing call privacy for a wireless device connected to a network node device comprising signaling by the wireless device to the network node device that privacy is requested, the step of signaling comprising communicating a request for privacy and an identifier to the network node device, wherein the identifier identifies the wireless device and wherein the request for privacy requests that the network node prevents bridging to other wireless devices that are configured as extension devices of the network node.

5. The method of claim 4, further comprising the step of communicating with the network node device to establish the eligibility of the wireless device to request privacy.

6. The method of claim 4, further comprising the step of communicating with the network node device to establish the eligibility of the wireless device to join a call in progress.

7. An article of manufacture for directing a wireless device to initiate connection with a network node device, said article of manufacture comprising:
   a computer readable medium having computer readable program code means embodied thereon, said computer readable program code means comprising program code means for causing a computer to:
   signal, by using at least one pre-established command channel, a request for a connection;
   communicate an identifier from the wireless device to the network node device, the identifier identifying the wireless device;
   select a wireless signaling method to be used between the wireless device and the network node device; and
   request privacy through one or more messages sent to the network node device, the one or more messages comprising the request for privacy and the identifier, wherein the request for privacy requests that the network node establishing said connection prevents bridging to other wireless devices that are configured as extension devices of said network node.

8. The article of manufacture of claim 7, wherein said computer readable program code means comprising program code means further causes a computer to communicate with the network node device to establish the eligibility of the wireless device to request privacy.

9. The article of manufacture of claim 7, wherein said computer readable program code means comprising program code means further causes a computer to communicate with the network node device to establish the eligibility of the wireless device to join a call in progress.

* * * * *